US009692583B2

(12) United States Patent
Burnitt et al.

(10) Patent No.: US 9,692,583 B2
(45) Date of Patent: Jun. 27, 2017

(54) DUPLEXER

(71) Applicant: BAE SYSTEMS PLC, London (GB)

(72) Inventors: David James Burnitt, Chelmsford (GB); Simon Charles Giles, Chelmsford (GB); Andrew Mark Steliou, Chelmsford (GB)

(73) Assignee: BAE Systems plc, London (GB)

( * ) Notice: Subject to any disclaimer, the term of this patent is extended or adjusted under 35 U.S.C. 154(b) by 30 days.

(21) Appl. No.: 14/890,337

(22) PCT Filed: May 8, 2014

(86) PCT No.: PCT/GB2014/051404
§ 371 (c)(1),
(2) Date: Nov. 10, 2015

(87) PCT Pub. No.: WO2014/181111
PCT Pub. Date: Nov. 13, 2014

(65) Prior Publication Data
US 2016/0182210 A1    Jun. 23, 2016

(30) Foreign Application Priority Data

May 10, 2013  (EP) ..................................... 13275115
May 10, 2013  (GB) ................................... 1308442.1

(51) Int. Cl.
*H04B 1/46* (2006.01)
*H04L 5/14* (2006.01)
(Continued)

(52) U.S. Cl.
CPC ................ *H04L 5/14* (2013.01); *H04B 1/44* (2013.01); *H04B 1/48* (2013.01); *H04L 43/16* (2013.01)

(58) Field of Classification Search
CPC .. H04B 1/48; H04B 1/44; H04L 43/16; H04L 5/14
(Continued)

(56) References Cited

U.S. PATENT DOCUMENTS 6,314,305 B1 *  11/2001  Solondz ................. H01Q 1/246
                                                    342/373
7,937,063 B1 *   5/2011  Rausch .................... H04B 1/48
                                                    333/100
(Continued)

FOREIGN PATENT DOCUMENTS

WO       03081275 A1   10/2003
WO    2013044481 A1    4/2013

OTHER PUBLICATIONS

International Preliminary Report on Patentability and Written Opinion for PCT Application No. PCT/GB2014/051404 dated Nov. 10, 2015, 7 pages.
(Continued)

*Primary Examiner* — Ping Hsieh
(74) *Attorney, Agent, or Firm* — Maine Cernota & Rardin

(57) ABSTRACT

According to a first aspect of the present invention, there is provided a duplexer for a radio frequency antenna, comprising: a radio frequency signal transmitter port arranged for connection to a radio frequency signal transmitter; a radio frequency signal receiver port arranged for connection to a radio frequency signal receiver; a switch arranged selectively to adopt either one of: a first state which connects the transmitter port to a common input/output port of the switch arranged for connection to a radio frequency antenna; and a second state which connects the receiver port to the common input/output port; a switch control unit arranged to monitor radio frequency power at the common input/output port and to receive a transmission gate signal; wherein the switch control unit is arranged to control the switch to adopt the first (Continued)

state upon receipt of the transmission gate signal, and, subsequently, to control the switch to adopt the second state when the monitored radio frequency power falls below a threshold level.

11 Claims, 2 Drawing Sheets

(51) Int. Cl.
  *H04B 1/48* (2006.01)
  *H04B 1/44* (2006.01)
  *H04L 12/26* (2006.01)
(58) Field of Classification Search
  USPC .................................................. 455/82, 83
  See application file for complete search history.

(56) References Cited

U.S. PATENT DOCUMENTS

| | | |
|---|---|---|
| 2004/0077316 A1 | 4/2004 | Xiong |
| 2004/0137854 A1 | 7/2004 | Ge |
| 2004/0259505 A1* | 12/2004 | Vasanth ................... H04B 1/48 455/78 |
| 2010/0279630 A1 | 11/2010 | Brady |

OTHER PUBLICATIONS

PCT Search Report for PCT Application No. PCT/GB2014/051404, dated Jun. 16, 2014, 9 pages.
EP Search Report for Application No. EP 13275115.7, dated Dec. 9, 2013, 5 pages.
GB Search Report for Application No. GB1308442.1, dated Nov. 6, 2013, 4 pages.

* cited by examiner

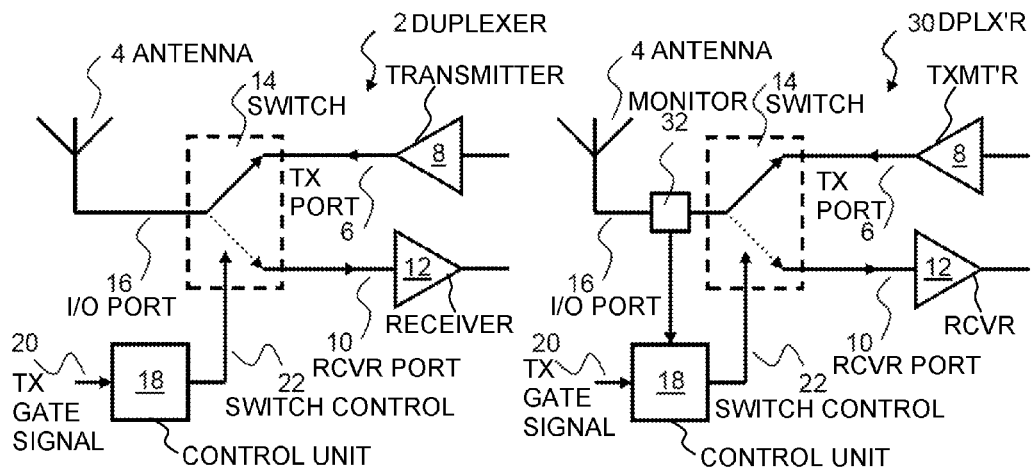
FIG. 1
PRIOR ART
FIG. 3
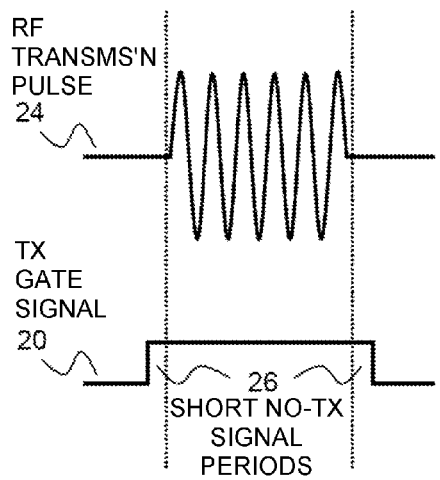
FIG. 2
PRIOR ART
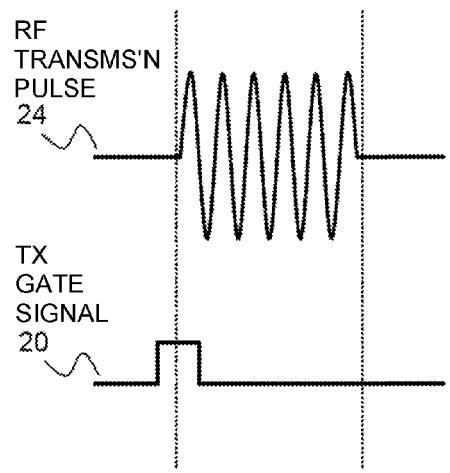
FIG. 4

DUPLEXER

RELATED APPLICATIONS

This application is a national phase application filed under 35 USC §371 of PCT Application No. PCT/GB2014/051404 with an International filing date of May 8, 2014 which claims priority of GB Patent Application 1308442.1 filed May 10, 2013 and EP Patent Application 13275115.7 filed May 10, 2013. Each of these applications is herein incorporated by reference in their entirety for all purposes.

FIELD OF THE INVENTION

The present invention relates to a duplexer, and in particular a duplexer for use with a radio frequency antenna. The present invention also relates to a radar system comprising such a duplexer, and also to a method of operating such a duplexer.

BACKGROUND OF THE INVENTION

A duplexer is a device that allows bi-directional communication over a common input/output port, which might be described as bi-directional communication over a single path. Typically, a duplexer alternately switches between transmit and receive states, which allows communication via a common input/output port and, for instance, connection to a single antenna or antenna array for transmission and reception of radio frequency signals. The switching between specific dedicated transmission and reception states is to prevent relatively high-power pulses of the transmitter from entering the receiver, which could damage or destroy the receiver.

In order to prevent damage to the receiver, the duplexer is typically kept in a transmit state for a deliberate predetermined period of time after the transmission pulse has been generated, to ensure that the generated pulse cannot enter the receiver. Although this does indeed give a degree of protection to the receiver, this same period of protection also limits the speed at which the duplexer can be switched from a transmission state to a reception state.

It is an aim of an example embodiment of the present invention to at least partially obviate or mitigate one or more problems of the prior art, whether identified herein or elsewhere, or to provide an alternative to prior art apparatus or methods.

SUMMARY OF THE INVENTION

According to the present invention there is provided apparatus and methods as set forth in the appended claims. Other features of the invention will be apparent from the dependent claims, and the description which follows.

According to a first aspect of the present invention, there is provided a duplexer for a radio frequency antenna, comprising: a radio frequency signal transmitter port arranged for connection to a radio frequency signal transmitter; a radio frequency signal receiver port arranged for connection to a radio frequency signal receiver; a switch arranged selectively to adopt either one of: a first state which connects the transmitter port to a common input/output port of the switch arranged for connection to a radio frequency antenna; and a second state which connects the receiver port to the common input/output port; a switch control unit arranged to monitor radio frequency power at the common input/output port and to receive a transmission gate signal; wherein the switch control unit is arranged to control the switch to adopt the first state upon receipt of the transmission gate signal, and, subsequently, to control the switch to adopt the second state when the monitored radio frequency power falls below a threshold level.

The transmission gate signal may comprise a pulse. A transmission gate signal pulse width may be shorter than a radio frequency transmission pulse width.

The switch control unit may be arranged to monitor radio frequency power at the common input/output port for a period of time sufficient to determine if the monitored power constitutes part of a transmission pulse.

The switch control unit is arranged to control the switch to adopt the second state when the monitored radio frequency power falls below the threshold level for a period of time sufficient to determine if the monitored power constitutes part of a transmission pulse.

The threshold level may be a level above which damage would result to the radio frequency receiver.

The switch control unit may be arranged to monitor radio frequency power at a plurality of locations at the common input/output port.

The switch control unit may be arranged to monitor radio frequency power at the common input/output port using one or more couplers, for example one or more tap couplers.

The switch may comprise a PIN diode.

The common input/output port may comprise, or be connected to, an antenna.

According to a second aspect of the present invention, there is provided a duplexer for a radio frequency antenna, the duplexer being configured to be switched from a transmit state to a receive state when radio frequency power monitored at a common input/output port of the switch falls below a threshold level.

According to a third aspect of the present invention, there is provided a radar system comprising a duplexer according to an aspect of the present invention.

According to a fourth aspect of the present invention, there is provided a method of operating a duplexer for a radio frequency antenna, the duplexer comprising: a radio frequency signal transmitter port arranged for connection to a radio frequency signal transmitter; a radio frequency signal receiver port arranged for connection to a radio frequency signal receiver; a switch arranged selectively to adopt either one of: a first state which connects the transmitter port to a common input/output port of the switch arranged for connection to a radio frequency antenna; and a second state which connects the receiver port to the common input/output port; a switch control unit arranged to receive a transmission gate signal; wherein the switch control unit is arranged to control the switch to adopt the first state upon receipt of the transmission gate signal, the method comprising: monitoring radio frequency power at the common input/output port; and subsequent to the switch adopting the first state, controlling the switch to adopt the second state when the monitored radio frequency power falls below a threshold level.

According to a fifth aspect of the present invention, there is provided a method of operating a duplexer for a radio frequency antenna, the method comprising switching the duplexer from a transmit state to a receive state when radio frequency power monitored at a common input/output port of the switch falls below a threshold level.

According to a sixth aspect of the present invention, there is provided a duplexer, radar system or method substantially as herein described, or substantially as herein described with reference to the accompanying Figures, or substantially as shown in the accompanying Figures.

One or more features of any aspect/embodiment described herein may, where appropriate to the skilled person, be combined with and/or replace one or more features of another aspect/embodiment, without departing from the scope of the invention as defined by the claims.

BRIEF DESCRIPTION OF THE DRAWINGS

For a better understanding of the invention, and to show how embodiments of the same may be carried into effect, reference will now be made, by way of example, to the accompanying diagrammatic Figures in which:

FIG. 1 schematically depicts a prior art duplexer;

FIG. 2 schematically depicts principles associated with the operation of the prior art duplexer of FIG. 1;

FIG. 3 schematically depicts a duplexer according to an example embodiment of the present invention;

FIG. 4 schematically depicts principles associated with the operation of the duplexer of FIG. 3.

The Figures have not been drawn to any particular scale, and are simply provided as an aid to understanding the invention. The same features appearing in different Figures have been given the same reference numerals, for consistency and clarity.

DETAILED DESCRIPTION

Figure 5:
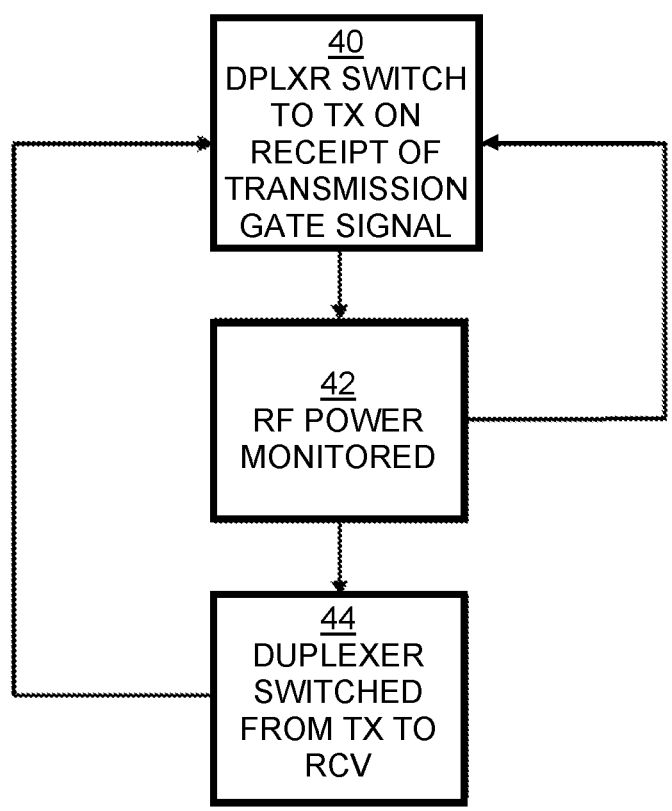
FIG. 5 schematically depicts a method of operating a duplexer, in accordance with an example embodiment of the present invention.

FIG. 1 schematically depicts a prior art duplexer (2) for a radio frequency antenna (4). The duplexer (2) comprises a radio frequency signal transmitter port (6) arranged for connection to a radio frequency signal transmitter (8). The duplexer (2) further comprises a radio frequency signal receiver port (10) arranged for connection to a radio frequency signal receiver (12).

"Port" as used herein is an arrangement that allows a signal to be provided to/from the element in question, and might comprise a wire, a connector, or something more elaborate.

In the Figure, the transmitter (8) and receiver (12) are schematically depicted by way of amplifiers, but it will be appreciated that the transmitter (8) and receiver (12) will in practice most likely comprise more components than this. The Figure is simply given as an aid to understanding the invention, with the amplifiers indicating the presence of a transmitter (8) and receiver (12).

The duplexer (2) further comprises a switch (14). The switch (14) is arranged selectively to adopt either one of a first state and a second state. In the first state, which is a transmit state, the switch (14) connects the transmitter port (6) to a common input/output port (16) of the switch (14), which is in turn arranged for connection to the radio frequency antenna (4). In the second state, which is a receive or reception state, the switch (14) connects the receiver port (10) to the common input/output port (16), again for connection to the radio frequency antenna (4). The switch (14) may be, for instance, any switch that is capable of both handling the required radio frequency transmission load, and also switching at a speed that is desirable for appropriate transmission and reception of signals.

The duplexer (2) further comprises a switch control unit (18) that is arranged to receive a transmission gate signal (20). The switch control unit (18) is arranged to control (22) the switch (14) to adopt the aforementioned first state upon receipt of the transmission gate signal (20).

Operation of the duplexer of FIG. 1 will now be described with reference to FIG. 2. FIG. 2 schematically depicts the transmission gate signal (20) relative to a radio frequency transmission pulse (24) generated by the transmitter. It can be seen that the transmission gate signal (20) pulse width is greater than, and extends beyond, the radio frequency transmission (24) pulse width. This ensures that the duplexer is in a transmission state when a transmission signal is generated. However, there are also short periods (26) at the beginning and end of the transmission gate signal (20) pulse, where there is, in fact, no transmission signal.

For the period (26) prior to the generation of the transmission signal (24), this period (26) ensures that the duplexer is in a ready state for transmission of the transmission signal (24). However, for the period (26) after such transmission (24), a short period (26) is provided before the transmission gate signal ends (or goes low). This latter period (26) is provided to ensure that there is little or no chance of the relatively high power transmission signal being connected to and thus damaging or destroying the sensitive receiver. Although this latter period (26) might indeed serve its purpose of providing this degree of protection, this period (26) also, and the same time, limits the speed at which the duplexer can switch from a transmission state to a receiving state.

In some instances, the limitation of the switching speed may not be problematic, for example when an echo of the transmission signal is received, expected to be received, or is usually received, after the transmission gate signal pulse has ended. However, this might not always be the case, especially if the echo is returned more quickly, for example, if a subject causing the echo is relatively close to the antenna. It is during this latter scenario that problems might arise. In particular, it might be difficult or impossible to detect subjects within a range of the antenna that will result in a generated echo arriving at the duplexer before the duplexer was switched, or could be switched, to a receiving state.

According to an example embodiment of the present invention, the problems discussed above with prior art duplexers may be at least partially obviated or mitigated.

FIG. 3 schematically depicts a duplexer (30) according to an example embodiment of the present invention. The duplexer (30) shares many of the features of the duplexer of the prior art, as shown in and described with reference to FIG. 1. Thus, the same features appearing in FIGS. 1 and 3 have been given the same reference numerals for consistency and clarity. However, a significant difference between the duplexer of the prior art and the duplexer (30) of FIG. 3 is that the duplexer of FIG. 3 comprises a monitor (32). The monitor (30) allows the switch control unit (18) to monitor radio frequency power at the common input/output port (16). The switching of the duplexer (30) from the transmission to the reception state is now dependent on, at least partially controlled by, this monitoring.

The switch control unit (18) is, as with the prior art, arranged to control the switch (14) and duplexer (30) to adopt the transmission state upon receipt of the transmission gate signal (20). However, contrary to the operation of the prior art duplexer, the switch control unit (18) is, additionally, subsequently arranged to control the switch (14) and duplexer (30) to adopt the reception state when the monitored radio frequency power falls below a threshold level. That is, the switching from the transmission state to the reception state is not determined or forced by termination of the transmission gate signal pulse (i.e. from a high to a low level), but is instead determined by the monitored radio frequency power at the common input/output port falling below a threshold level.

FIG. 4 schematically depicts principles associated with the operation of the duplexer of FIG. 3. Referring to FIG. 4, it can be seen that, contrary to the prior art scenario shown in FIG. 2, in FIG. 4 the transmission gate signal (20) has a pulse width that does not extend beyond the transmission signal (24). Indeed, the transmission gate signal (20) of FIG. 4 has a pulse width that is shorter than the radio frequency transmission (24) pulse width. This sort of control regime is now allowed because, as already discussed above, it is no longer the termination of the transmission gate signal (20) pulse that determines the switching of the duplexer from the transmission to the reception state. Instead, it is the monitoring of the radio frequency power at the common input/output port falling below a threshold level that determines the switching of the duplexer from the transmission to the reception state.

As a result of the described control regime, the change in state from transmission to reception is no longer determined in any way by a period during which the transmission signal deliberately holds the duplexer in a transmission state after termination of the transmission pulse in order to protect the receiver. Instead, the change in state is now determined by the speed at which the aforementioned monitoring and switching can take place. This can be achieved very quickly. This is particularly true if the switch of the duplexer comprises a PIN diode. A PIN diode is capable of handling the relatively high transmission loads of a transmission signal, and is also capable of switching quickly, thus serving the needs of the duplexer very well.

Monitoring the power at the common input/output port to determine switching of the duplexer is, as already discussed above, advantageous. Firstly, the switching speed may be increased in comparison with prior art duplexers which rely on termination of a transmission gate signal to switch from a transmission to a reception state. However, an associated benefit of the example embodiment of the present invention is that the receiver is also implicitly protected by the described control regime. This is because the duplexer will only switch from a transmission state to a reception state when the monitored power is at a level which is determined (e.g., in advance) to be safe for the receiver of the duplexer—i.e. below a threshold level.

The abovementioned "monitoring" and "threshold level" can be implemented in any particular manner, for example specific to the exact details of the transmission signal, transmission gate signal, circuit components, and so on. However, some general principles might nevertheless still apply. For instance, the monitoring may be facilitated by the use of one or more couplers, which may be referred to as, or be, tap couplers. A coupler may be an efficient way of determining the power at the common input/output port. The coupling might, in itself, be used to power or similarly provide a monitoring signal to the switch control unit. This may further increase monitoring and switching speeds.

The monitoring may take place at a single location at the common input/output port. Alternatively, the monitoring may take place at a plurality of locations at the common input/output port. Use of a plurality of monitoring locations may provide a degree of redundancy if a monitor becomes damaged or unreliable, and/or might allow for a greater degree of certainty in the monitoring, and thus in determining whether switching should be undertaken.

Depending on the exact implementation of the duplexer, and its use, then as soon as the monitored radio frequency power falls below a pre-determined threshold level, the switching from the transmission to the reception state may take place. However, the nature of the transmission signal or similar may make this approach impractical, difficult to implement, or undesirable. Thus, in some instances it may be desirable or advantageous to monitor the radio frequency power at the common input/output port for a period of time that is sufficient to determine if the monitored power constitutes part of a transmission pulse, and not simply a lower level within a pulse, or a low level at a beginning of a pulse, or similar. Similarly, or alternatively, the switch control unit may be arranged to control the switch to adopt the reception state when the monitored radio frequency power falls below the threshold value for a period of time to determine if the monitored power constitutes part of a transmission pulse. The time may be known in advance from knowledge of the transmission signal, for example its form, shape, duration, and the like.

Generally, it is typically likely that the threshold level will be a level above which level damage would result to the radio frequency receiver.

FIG. 5 shows a flowchart which depicts how an example embodiment of the duplexer may operate.

Initially, the duplexer may be switched to a transmit state upon receipt of a transmission gate signal (40). Radio frequency power at a common input/output port of the duplexer is monitored (42). If the monitored radio frequency power does not fall below a threshold level, then the duplexer may be maintained in the transmit state (40), which may be achieved by not switching to the receive state. If the monitored radio frequency power does fall below a threshold level, then the duplexer may be switched from the transmit state to the receive state (44). The duplexer may be switched back to the transmit state by appropriate application of a transmission gate signal (40), ready for transmission of another transmission pulse.

The duplexer described above may find use in a number of different applications, but may find particular use in a radar system where quickly switching from a transmission to a reception state is of particular importance, especially when subjects relatively close to the antenna of the radar system are to be detected and/or tracked.

The invention has been described above in relatively specific technical terms. The invention might be more generally and/or functionally described. For example, the invention might be described as relating to a duplexer for a radio frequency antenna. The duplexer is configured to be switched from a transmit state to a receive state when radio frequency power monitored at a common input/output port of the switch falls below a threshold level. Similarly, a more functional definition of the use of a duplexer might be described as comprising the switching of the duplexer from a transmit state to a receive state when radio frequency power monitored at a common input/output port of the switch falls below a threshold level. It will be understood such a functional definition is not necessarily describing a different invention, but simply describing the same invention as already discussed above, but in more general and functional terms.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/ or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A duplexer for a radio frequency antenna, comprising:
    a radio frequency signal transmitter port arranged for connection to a radio frequency signal transmitter;
    a radio frequency signal receiver port arranged for connection to a radio frequency signal receiver;
    a switch arranged selectively to adopt either one of:
        a first state which connects the transmitter port to a common input/output port of the switch arranged for connection to a radio frequency antenna; and
        a second state which connects the receiver port to the common input/output port;
    a switch control unit arranged to monitor radio frequency power at the common input/output port and to receive a transmission gate signal;
    wherein the switch control unit is arranged to control the switch to adopt the first state upon receipt of the transmission gate signal, and, subsequently, to control the switch to adopt the second state when the monitored radio frequency power falls below a threshold level.

2. The duplexer of claim 1, wherein the transmission gate signal comprises a pulse, and wherein a transmission gate signal pulse width is shorter than a radio frequency transmission pulse width.

3. The duplexer of claim 1, wherein the switch control unit is arranged to monitor radio frequency power at the common input/output port for a period of time sufficient to determine if the monitored power constitutes part of a transmission pulse.

4. The duplexer of claim 1, wherein the switch control unit is arranged to control the switch to adopt the second state when the monitored radio frequency power falls below the threshold level for a period of time sufficient to determine if the monitored power constitutes part of a transmission pulse.

5. The duplexer of claim 1, wherein the threshold level is a level above which damage would result to the radio frequency signal receiver.

6. The duplexer of claim 1, wherein the switch control unit is arranged to monitor radio frequency power at a plurality of locations at the common input/output port.

7. The duplexer of claim 1, wherein the switch control unit is arranged to monitor radio frequency power at the common input/output port using one or more couplers.

8. The duplexer of claim 1, wherein the switch comprises a PIN diode.

9. The duplexer of claim 1, wherein the common input/output port comprises or is connected to an antenna.

10. A radar system comprising the duplexer of claim 1.

11. A method of operating a duplexer for a radio frequency antenna, the duplexer comprising:
    a radio frequency signal transmitter port arranged for connection to a radio frequency signal transmitter;
    a radio frequency signal receiver port arranged for connection to a radio frequency signal receiver;
    a switch arranged selectively to adopt either one of:
        a first state which connects the transmitter port to a common input/output port of the switch arranged for connection to a radio frequency antenna; and
        a second state which connects the receiver port to the common input/output port;
    a switch control unit arranged to receive a transmission gate signal;
    wherein the switch control unit is arranged to control the switch to adopt the first state upon receipt of the transmission gate signal,
    the method comprising:
    monitoring radio frequency power at the common input/output port; and
    subsequent to the switch adopting the first state, controlling the switch to adopt the second state when the monitored radio frequency power falls below a threshold level.

* * * * *